(12) United States Patent
Ishii

(10) Patent No.: US 10,642,543 B2
(45) Date of Patent: May 5, 2020

(54) PRINTER AND WEIGHT MEASURING APPARATUS CONFIGURED TO A WEIGH A TARGET AND OUTPUT WEIGHT DATA OF THE TARGET AND MEDIUM STORING PRINT PROCESSING PROGRAM

(71) Applicant: BROTHER KOGYO KABUSHIKI KAISHA, Aichi-ken (JP)

(72) Inventor: Hidekazu Ishii, Aichi-ken (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/356,645

(22) Filed: Mar. 18, 2019

(65) Prior Publication Data
US 2019/0369928 A1 Dec. 5, 2019

(30) Foreign Application Priority Data
Jun. 1, 2018 (JP) ................................ 2018-106127

(51) Int. Cl.
*G06F 3/12* (2006.01)
*H04N 1/00* (2006.01)
*G01G 23/18* (2006.01)

(52) U.S. Cl.
CPC ........... *G06F 3/1206* (2013.01); *G01G 23/18* (2013.01); *G06F 3/1243* (2013.01); *G06F 3/1247* (2013.01); *G06F 3/1284* (2013.01); *H04N 1/00323* (2013.01)

(58) Field of Classification Search
None
See application file for complete search history.

(56) References Cited

U.S. PATENT DOCUMENTS

| | | | | |
|---|---|---|---|---|
| 4,516,209 | A * | 5/1985 | Scribner | G01G 19/005 177/25.15 |
| 2012/0043375 | A1* | 2/2012 | Ueda | G01G 19/4144 235/3 |
| 2015/0347877 | A1* | 12/2015 | Kanda | G06K 15/022 358/1.15 |

FOREIGN PATENT DOCUMENTS

| | | |
|---|---|---|
| JP | S62-272126 A | 11/1987 |
| JP | S63-14289 B2 | 3/1988 |
| JP | H04-9719 A | 1/1992 |
| JP | H09-58644 A | 3/1997 |
| JP | H11-94632 A | 4/1999 |

(Continued)

*Primary Examiner* — Thomas D Lee
(74) *Attorney, Agent, or Firm* — Knealy Vaidya LLP

(57) ABSTRACT

A printer connectable to a weight measuring apparatus includes: a printing head performing printing on a print medium; and a controller. The controller performs: a data base obtaining processing of obtaining a data base having first and second fields; a template obtaining processing of obtaining a template having an input object and an output object arranged therein in a predetermined aspect; a weight data allocating processing of allocating the weight data received from the weight measuring apparatus to the input object of the template; an output value allocating processing of allocating, to the output object, an output value corresponding to the weight data and determined based on the data base; and a printing processing of performing the printing on the print medium based on the template wherein the weight data is allocated to the input object and the determined output value is allocated to the output object.

8 Claims, 15 Drawing Sheets

(56) References Cited

FOREIGN PATENT DOCUMENTS

JP          2014-21910 A     2/2014

* cited by examiner

Fig. 5A

WEIGHT-RESULT DATA BASE

RESOLUTION-CORRESPONDING TYPE

| GRAM | RESULT |
|---|---|
| 0.1 | NG |
| 0.2 | NG |
| . | NG |
| . | NG |
| . | NG |
| 1.0 | NG |
| . | NG |
| . | NG |
| . | NG |
| 10.0 | OK |
| . | OK |
| . | OK |
| . | OK |
| 100.0 | OK |
| . | NG |
| . | NG |
| . | NG |
| 1000.0 | NG |

Fig. 5B

WEIGHT-RESULT DATA BASE

RANGE-CORRESPONDING TYPE

| GRAM | RESULT |
|---|---|
| 9.9 | NG |
| 100.0 | OK |
| 1000.0 | NG |

(REPRESENTED BY UPPER LIMIT VALUE)

Fig. 8A

WEIGHT-FEE DATA BASE

RESOLUTION-CORRESPONDING TYPE

| GRAM | YEN |
|---|---|
| 0.1 | 82 |
| . | 82 |
| 25.0 | 82 |
| . | 120 |
| 50.0 | 120 |
| . | 140 |
| 100.0 | 140 |
| . | 205 |
| 150.0 | 205 |
| . | 250 |
| 250.0 | 250 |
| . | 380 |
| 500.0 | 380 |
| . | 570 |
| 1000.0 | 570 |

Fig. 8B

WEIGHT-FEE DATA BASE

RANGE-CORRESPONDING TYPE

| GRAM | YEN |
|---|---|
| 25.0 | 82 |
| 50.0 | 120 |
| 100.0 | 140 |
| 150.0 | 205 |
| 250.0 | 250 |
| 500.0 | 380 |
| 1000.0 | 570 |

(REPRESENTED BY UPPER LIMIT VALUE)

Fig. 11A

WEIGHT-SIZE-FEE DATA BASE

THREE COLUMN RANGE-CORRESPONDING TYPE

| INPUT | | OUTPUT |
|---|---|---|
| SIZE | WEIGHT | FEE |
| 60 | 2.0 | 740 |
| 80 | 5.0 | 1000 |
| 100 | 10.0 | 1260 |

(REPRESENTED BY UPPER LIMIT VALUE)

Fig. 11B

WEIGHT-SIZE-FEE DATA BASE

TWO-DIMENSIONAL RANGE-CORRESPONDING TYPE

| | | WEIGHT | | |
|---|---|---|---|---|
| | | 2 | 5 | 10 |
| SIZE | 60 | 740 | 740 | 1000 |
| | 80 | 740 | 1000 | 1000 |
| | 100 | 1000 | 1000 | 1260 |

(REPRESENTED BY UPPER LIMIT VALUE)

(REPRESENTED BY UPPER LIMIT VALUE)

Fig. 12A
WEIGHT-FEE DATA BASE

RANGE-CORRESPONDING TYPE

| GRAM | YEN |
|---|---|
| 500.0 | 350 |
| 1000.0 | 500 |
| 2000.0 | 750 |
| 3000.0 | 900 |

(REPRESENTED BY UPPER LIMIT VALUE)
COMPANY A

Fig. 12B
WEIGHT-FEE DATA BASE

RANGE-CORRESPONDING TYPE

| GRAM | YEN |
|---|---|
| 500.0 | 400 |
| 1000.0 | 520 |
| 2000.0 | 730 |
| 3000.0 | 880 |

(REPRESENTED BY UPPER LIMIT VALUE)
COMPANY B

Fig. 12C
WEIGHT-FEE DATA BASE

RANGE-CORRESPONDING TYPE

| GRAM | YEN |
|---|---|
| 25.0 | 82 |
| 50.0 | 120 |
| 100.0 | 140 |
| 150.0 | 205 |
| 250.0 | 250 |
| 500.0 | 380 |
| 1000.0 | 570 |

(REPRESENTED BY UPPER LIMIT VALUE)
COMPANY C

US 10,642,543 B2

PRINTER AND WEIGHT MEASURING APPARATUS CONFIGURED TO A WEIGH A TARGET AND OUTPUT WEIGHT DATA OF THE TARGET AND MEDIUM STORING PRINT PROCESSING PROGRAM

CROSS REFERENCE TO RELATED APPLICATION

The present application claims priority from Japanese Patent Application No. 2018-106127 filed on Jun. 1, 2018 the disclosure of which is incorporated herein by reference in its entirety.

BACKGROUND

Field of the Invention

The present disclosure relates to a printer which prepares a printed matter based on data transmitted from a weight measuring apparatus, and a medium storing a print processing program.

Description of the Related Art

There is known a configuration including a weighing machine and a label printer which is connected with respect to the weighing machine. In this configuration, in a case that the label printer receives weight measuring data from the weighing machine, the label printer prints a variety of kinds of data including for example an article (product) name, a processing date, etc., together with the weight measuring data, respectively on print zones of a recording medium, thereby preparing a label (see, for example, Japanese Patent Application Laid-open No. H09-58644).

SUMMARY

On the other hand, there may be such a need to perform printing not with the weight value itself of an object to be measured (measurement object), but in such an aspect wherein the weight value is converted into a content (another content) different from the weight value and corresponding to the weight value. This need can be exemplified by, for example, a case of performing printing of a predetermined digit string made to correspond proportionally to the weight value (a delivery fee or charge, etc., which is calculated to be more expensive as the weight becomes greater, etc.), a case of printing a character string representing whether or not the weight value satisfies a predetermined condition (for example, whether or not the weight value is within a predetermined weight range, etc.), and the like.

Generally, in a case of performing each of the above-exemplified printings, for example, a software according to the each of the needs and an operational terminal to which the software is applied, etc., are additionally required. In addition, a printer having a specification corresponding to and dedicated to each of the needs is required, resulting in decreasing the user-friendliness.

An object of the present disclosure is to provide a printer and a print processing program capable of performing printing in such an aspect wherein the weight value of an object or item to be measured is converted into a content which is different from the weight value. Another object of the present disclosure is to provide a medium storing the print processing program.

According to a first aspect of the present disclosure, there is provided a printer connectable to a weight measuring apparatus which is configured to measure weight of a measurement object and to output weight data corresponding to the measured weight, the printer including: a printing head configured to perform printing on a print medium; and a controller, wherein the controller is configured to execute: a data base obtaining processing of obtaining a data base having a first field and a second field, weight values being stored in the first field, output values corresponding respectively to the weight values being stored in the second field; a template obtaining processing of obtaining a template in which an input object and an output object are arranged in a predetermined manner, the input object being linked with the first field of the data base, the output object being linked with the second field of the data base; a weight data allocating processing of allocating the weight data received from the weight measuring apparatus to the input object of the template; an output value allocating processing of determining, based on the data base, an output value which corresponds to the weight data received from the weight measuring apparatus, and of allocating the determined output value to the output object of the template; and a printing processing of performing the printing on the print medium based on the template in which the weight data is allocated to the input object and the determined output value is allocated to the output object.

The printer in accordance with the first aspect is connected (connectable) to the weight measuring apparatus which measures the weight of a measurement object and outputs weight data corresponding to the measured weight. With this, it is possible to perform printing which corresponds to the result of the weight measurement performed by the weight measurement apparatus.

In this situation, there may be such a need to perform printing not with the weight value itself of the measurement object as the result of the measurement, but in such an aspect wherein the weight value is converted into another content which corresponds to the weight value but which is different from the weight value. This need can be exemplified by, for example, a case of performing printing of a predetermined digit string made to correspond proportionally to the weight value (a delivery fee, etc., which is calculated to be more expensive as the weight becomes greater, etc.), a case of printing a character string representing whether or not the weight value satisfies a predetermined condition (for example, whether or not the weight value is within a predetermined range, etc.), and the like.

However, generally, in a case of performing each of the above-exemplified printings, a software according to the each of the needs and an operational terminal to which the software is applied, etc., are additionally required. In addition, a printer corresponding to and dedicated to each of the needs is also required, resulting in decreasing the user-friendliness.

In view of the above situation, the present disclosure meets the above-exemplified needs by expanding the function of the template usable in the printing performed by the printer and by linking the objects inside the template with the data base.

Namely, in the data base obtaining processing, the controller obtains the data base having the first field and the second field. Further, in the template obtaining processing, the controller obtains the template which is provided with the input object which is linked with the first field of the data base and the output object which is linked with the second field of the data base.

Afterwards, in the weight data allocating processing, the controller allocates the weight data received from the weight measuring apparatus to the input object. Further, in the output value allocating processing, the controller determines the output value which corresponds to the obtained output value, based on the obtained (received) data base, and allocates the determined output value to the output object. Furthermore, in the printing processing, the controller performs printing on the print medium by using the template in which the weight data and the output value are allocated respectively to the two objects (input object and output object) in the above-described manner.

As described above, according to the first aspect of the present disclosure, the expanded function, of the template, for linking each of the two objects with the data base is used to thereby make it possible to perform printing in such an aspect wherein the weight value of the measurement object is converted into another content different from the weight value. As a result, since this eliminates any needs to additionally prepare the software and/or the operation terminal as described above, the user-friendliness can be improved.

According to a second aspect of the present disclosure, there is provided a non-transitory computer-readable medium storing programs executable by a processor of a terminal which is connectable to a printer and a weight measuring apparatus, the weight measuring apparatus being configured to weigh a target and output weight data of the target, the programs, when executed by the processor, causing the terminal to execute: a data base generating processing of generating a data base having a first field and a second field, weight values being stored in the first field, output values corresponding respectively to the weight values being stored in the second field; a first template generating processing of generating a template in which an input object and an output object are arranged in a predetermined manner, the weight data received from the weight measuring apparatus being allocated to the input object, an output value which corresponds to the weight data received from the weight measuring apparatus and which is determined based on the data base being allocated to the output object; and a first transmitting processing of transmitting the data base and the template to the printer.

According to a third aspect of the present disclosure, there is provided a non-transitory computer-readable medium storing programs executable by a processor of a terminal which is connectable to a printer, the printer being connectable to a weight measuring apparatus which is configured to weigh a target and output weight data of the target, the programs, when executed by the processor, causing the terminal to execute: a data base generating processing of generating a data base having a first field and a second field, weight values being stored in the first field, output values corresponding respectively to the weight values being stored in the second field; a second template generating processing of generating a template in which an input object linked with the first field and an output object linked with the second field are arranged in a predetermined manner; a weight data allocating processing of obtaining the weight data from the weight measuring apparatus via the printer and of allocating the weight data to the input object of the template; an output value allocating processing of allocating an output value, which corresponds to the weight data received from the weight measuring apparatus and which is determined based on the data base, to the output object of the template; a print data generating processing of generating print data usable for performing printing on a print medium, by using the template in which the weight data is allocated to the input object and the output value corresponding to the weight value is allocated to the output object; and a second transmitting processing of transmitting the print data to the printer.

According to the present disclosure, it is possible to perform printing in such an aspect wherein the weight value of the measurement object is converted into another content which is different from the weight value.

BRIEF DESCRIPTION OF THE DRAWINGS

FIGS. 5A and 5B are each a view of a specific example of a weight-result data base usable in the weight-result conversion outputting processing, wherein FIG. 5A depicts a data base of a resolution-corresponding type and FIG. 5B depicts a data base of a range-corresponding type.

FIGS. 8A and 8B are each a view depicting a specific example of a weight-fee data base usable in the weight-fee conversion outputting processing, wherein FIG. 8A depicts a data base of the resolution-corresponding type and FIG. 8B depicts a data base of the range-corresponding type.

FIGS. 11A and 11B are each a view depicting a specific example of a weight-size-fee data base for converting a fee as one output parameter corresponding to two input parameters which are a weight value and size, wherein FIG. 11A depicts a data base of a three column range-corresponding type and FIG. 11B depicts a data base of a two-dimensional range corresponding type.

FIGS. 12A, 12B and 12C are views depicting respectively specific examples of three kinds of weight-fee data base of which weight range width and fees corresponding thereto are different among one another.

DESCRIPTION OF THE EMBODIMENTS

In the following, an embodiment of the present disclosure will be explained, with reference to the drawings.

A label printer of the present embodiment executes a print label preparing processing. By the print label preparing processing, a weight value of weight data outputted by a weight measuring apparatus and an output value corresponding to the weight value are printed, and a print label is thereby prepared.

<Schematic Configuration of Print Label Preparing System>

Figure 1:
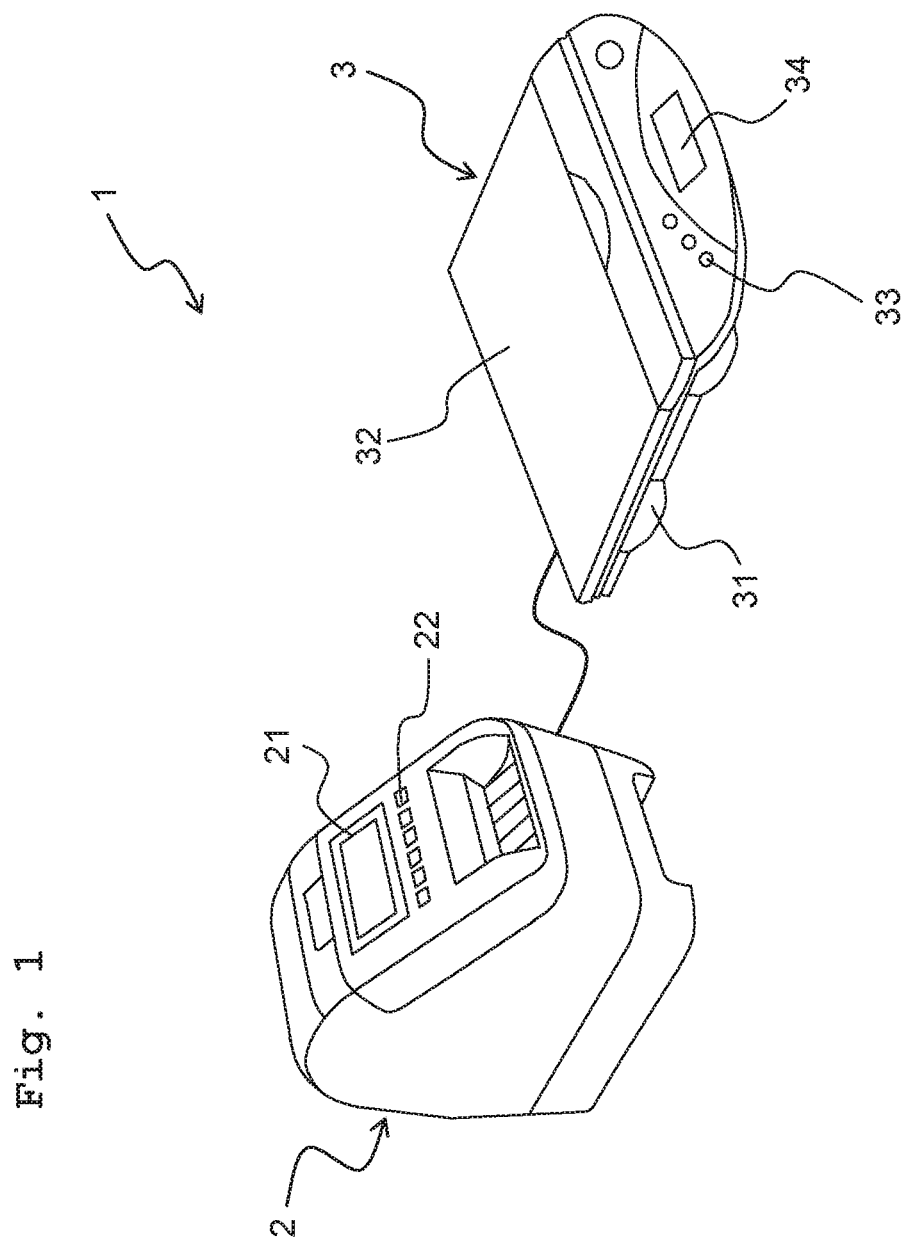
FIG. 1 is a schematic view of a print label preparing system provided with a printer according to an embodiment of the present disclosure.

As depicted in FIG. 1, a print label preparing system 1 is provided with a label printer 2 and a weight measuring apparatus 3. In the depicted example, the weight measuring apparatus 3 is connected with respect to the label printer 2 via a wired communication such as USB, etc., such that information can be transmitted and received between the weight measuring apparatus 3 and the label printer 2.

The weight measuring apparatus 3 has: an apparatus body 31; a loading plate 32 having a flat-plate shape and arranged at a position above the apparatus body 31; an operating button 33 operable by a user and arranged on a front side relative to the apparatus body 31; and a display panel 34 provided, for example, with a liquid crystal display, etc. In a case that the user places a measurement object (object to be measured; not specifically illustrated in the drawings) on the loading plate 32, the weight measuring apparatus 3 automatically measures the weight of the measurement object, and transmits the result of measurement to the label printer 2, as weight measuring data (corresponding to weight data; to be described later on).

The label printer 2 (corresponding to a printer) is provided with a display 21 and an operation part 22. The display 21 is constructed, for example, of a liquid crystal display and which is configured to display the weight measuring data, a variety of kinds of information, or a variety of kinds of messages. The operation part 22 includes a plurality of buttons which can be pressed down by the user. In a case that the label printer 2 receives the weight measuring data from the weight measuring apparatus 3, the label printer 2 itself prints the content of the weight measuring data so as to prepare a print label (not specifically depicted in the drawings). Namely, in the print label preparing system 1, the label printer 2 has a function as a host apparatus in a network to which the weight measuring apparatus 3 as an information inputting terminal is connected.

<Functional Configuration of Label Printer>

Figure 2:
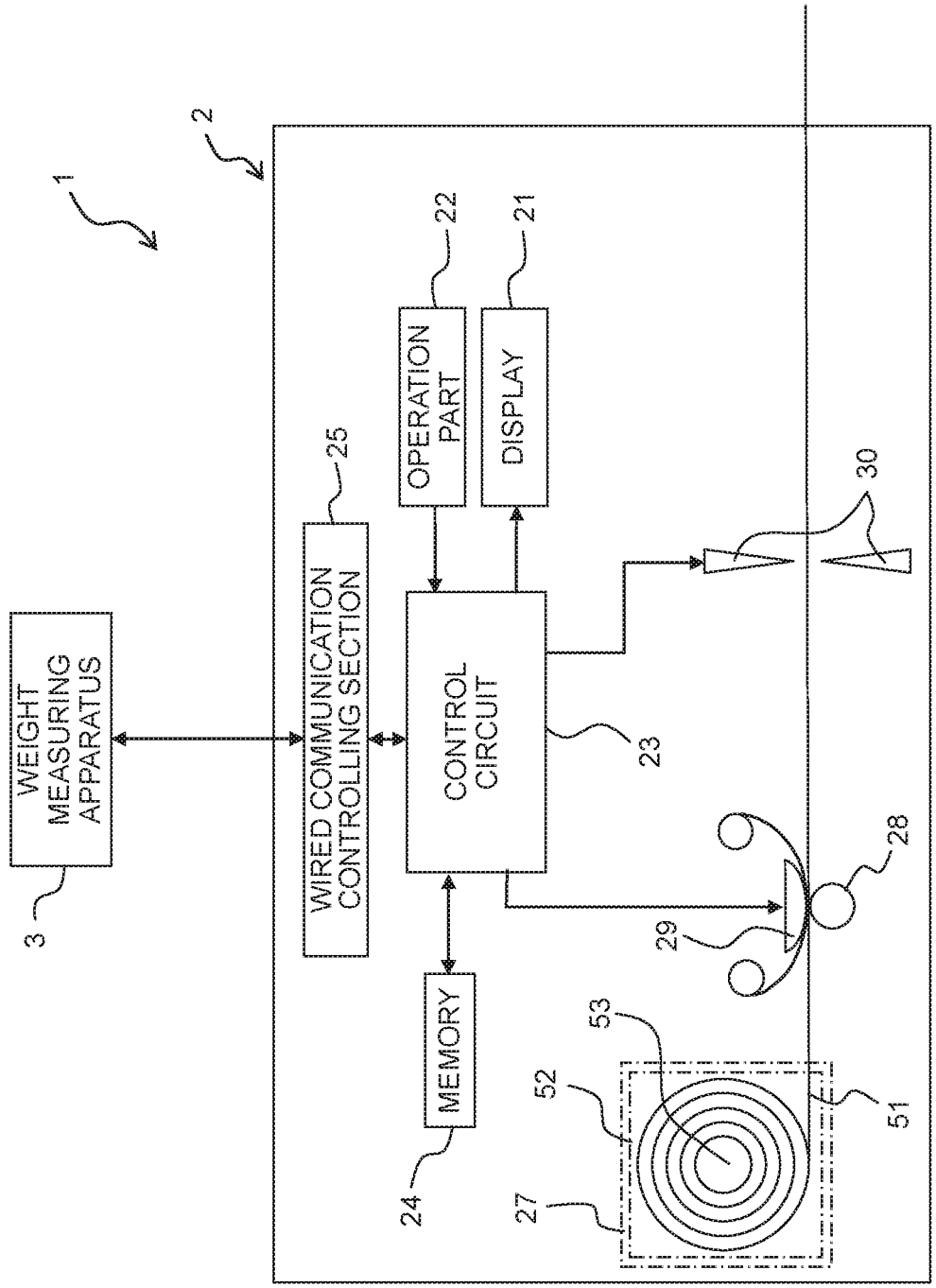
FIG. 2 is a block diagram depicting the functional configuration of a label printer.

An explanation will be given about the functional configuration of the above-described label printer 2, with reference to FIG. 2. As depicted in FIG. 2, the label printer 2 has a control circuit 23, a memory 24 storing a variety of kinds of information, a wired communication controlling section 25, the display 21, the operation part 22, a cartridge holder 27, a conveying device 28, a printing head 29 and a cutter 30.

The wired communication controlling section 25 controls information communication (telecommunication) performed with respect to the weight measuring apparatus 3, which is wire-connected thereto as described above. Namely, the weight measuring data transmitted by the weight measuring apparatus 3 is received by the label printer 2 via the wired communication controlling section 25.

Figure 9:
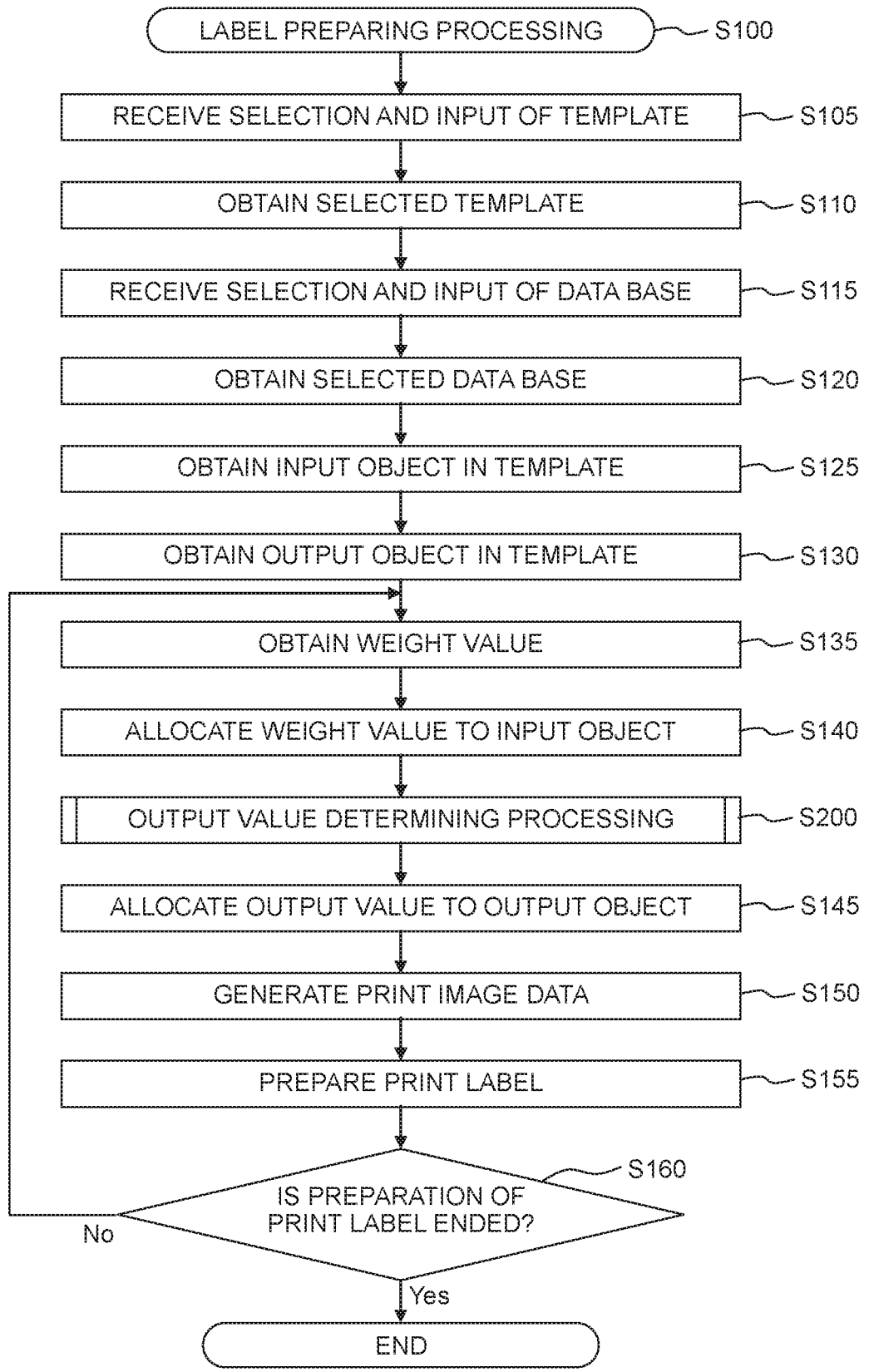
FIG. 9 is a flow chart depicting the procedure in a label preparing processing executed by a control circuit of the label printer.

The control circuit 23 (corresponding to a controller) is provided with non-illustrated CPU, RAM and ROM. The control circuit 23 execute a variety of kinds of programs previously stored in the ROM, while utilizing a temporary storing function of the RAM. By doing so, the control circuit 23 controls the entirety of the label printer 2. The variety of kinds of programs includes programs for executing procedures (to be described later on) as depicted in FIGS. 8 and 9, etc.

The memory 24 is constructed of a non-volatile memory in which memory content can be added and deleted, such as, for example, a flash memory, etc. The memory 24 is capable of storing a variety of kinds of template and a variety of kinds of data base (to be described later on) for preparing a print label.

The cartridge holder 27 is configured such that a cartridge 52 capable of supplying a tape 51 therefrom (corresponding to a print medium) is detachably attached to the cartridge holder 27. The cartridge 52 is provided with a tape roll 53 (which originally has a spiral shape but depicted as simplified with a concentric shape) having the tape 51 wound around a non-illustrated reel member.

The conveying device 28 is provided so as to face (to be opposite to) the printing head 29. The conveying device 28 is controlled by the control circuit 23 so as to convey the tape 51. The tape 51 is fed out from the tape roll 53 of the cartridge 52 attached to the cartridge holder 27 and is supplied to the conveying device 28.

The printing head 29 is controlled by the control circuit 23 so as to perform a desired printing with respect to the tape 51 conveyed by the conveying device 28.

The cutter 30 is controlled by the control circuit 23 so as to cut the tape 51 for which the printing by the printing head 29 has been ended, and to provide a print label from the cut tape 51.

The display 21 displays a variety of kinds of information including the weight measuring data and an operation screen, etc.

The operation part 22 receives a variety of kinds of inputs, by a depressing operation performed by the user.

In a case that the label printer 2 according to the present embodiment prepares a print label by utilizing a template, the label printer 2 performs printing by allocating a weight value (a value of weight) of the weight measuring data received from the weight measuring apparatus 3 and an output value corresponding to the weight value respectively to objects, in the template, as print contents of the objects. In this situation, the label printer 2 refers to a data base previously selected by the user, to thereby automatically determine an output value which is in a predetermined relationship with the received weight value and to allocate the determined output value to an object which is included in the objects of the template. Accordingly, the label printer 2 of the embodiment is capable of printing the weight value of the measurement object in such an aspect wherein the weight value is converted into another content which is different from the weight value, without requiring any additional software and/or operational terminal. The details of this will be explained in a step by step manner with reference to FIGS. 3 to 9.

Comparative Example: A Case of Performing the Processing Manually

Firstly, an explanation will be given about a comparative example which is a case of printing a weight value and an output value on a label by a processing manually performed by an user, with reference to FIG. 3. An example depicted in FIG. 3 is a case of printing a weight value of the measurement object measured in the weight measuring apparatus 3 and an output value indicating result of determination (OK or NG) as to whether or not the weight value is within a predetermined allowable range.

Figure 3:
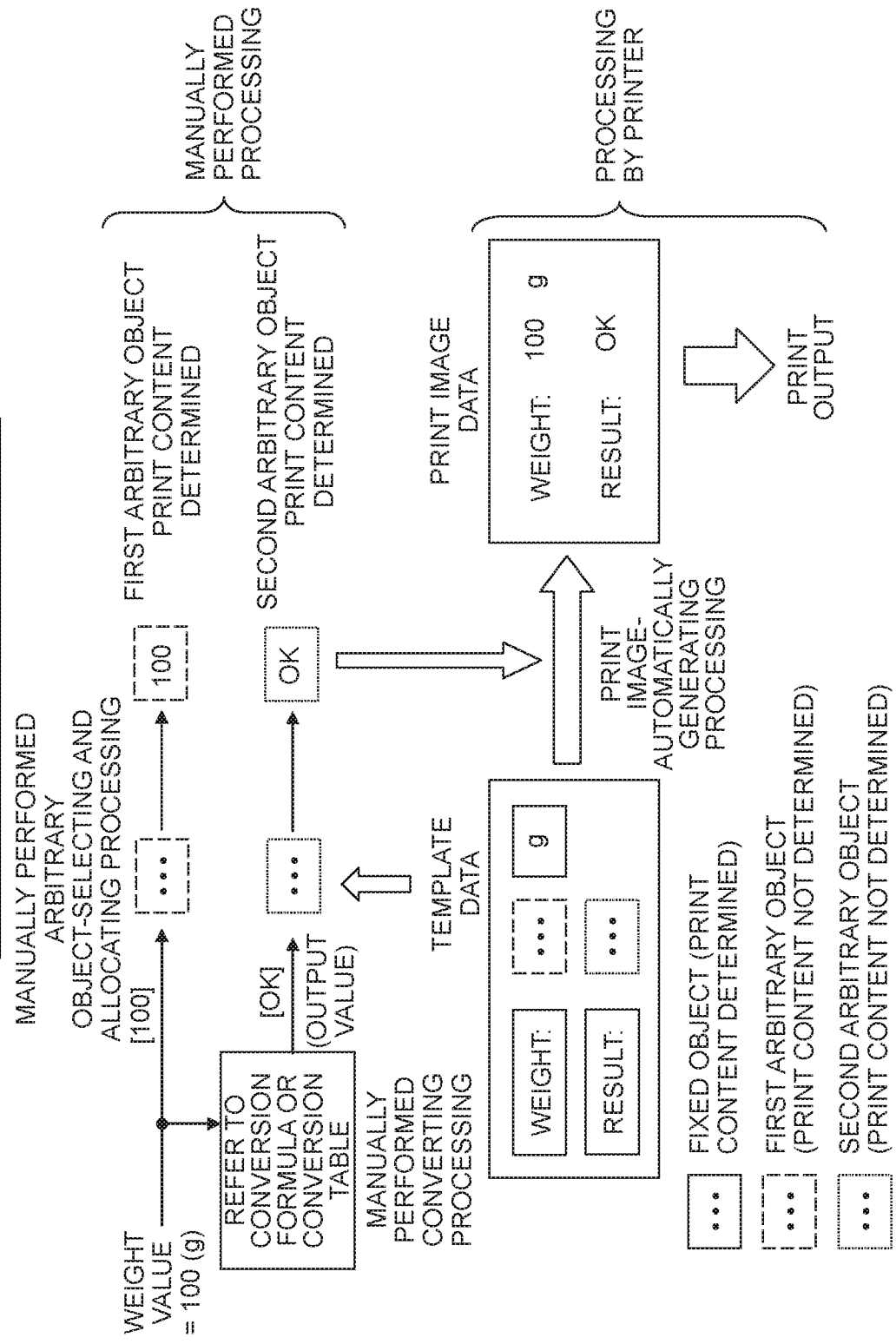
FIG. 3 is a view explaining the flow of processing a variety of kinds of data in a conventional example wherein a weight-result conversion outputting processing is manually processed.

In FIG. 3, a template to be used for the printing includes a fixed object, a first arbitrary object, and a second arbitrary object. An "object" is data defining the print aspect of print content data which is set corresponding to the object. The term "print aspect" means the arrangement (print position), the point (type size) and the style (boldface, italic, direction of arrangement, direction of posture, up/down, left/right, reverse, etc.), and the like in a print area of the print label. An object setting a print content in a fixed manner in the template is the fixed object; in the depicted example, "Weight:", "g" and "Result" are fixed objects, respectively. On the other hand, an arbitrary object is an object of which print content can be arbitrary set by a user; the depicted example includes two arbitrary objects which are the first and second arbitrary objects. Here, the first arbitrary object is an object corresponding to the weight value, and the second arbitrary object is an object corresponding to the output value.

The memory 24 of the label printer 2 stores a large number of kinds of templates including the template as described above, and the user can choose any template which the user wishes to use. On the other hand, the weight measuring apparatus 3 transmits the weight measuring data continuously and unilaterally at a sufficiently short cycle (for example, 100 ms). The label printer 2 is capable of automatically receiving data of the weight value from the received weight measuring data (in the depicted example, a numerical example "100"), with a predetermined unit (g), as a reference. As described above, the obtained weight value is allocated as the print content of the first arbitrary object.

Further, it is necessary to determine whether or not the obtained weight value is within the predetermined allowable range. This determination is made by referring to a conversion formula or conversion table indicating the relationship between the weight value and the predetermined allowable range, etc. In a case that the weight value is within the allowable range, the output value is represented by a character string "OK" (see FIG. 3), whereas in a case that the weight value is outside of the allowable range, the output value is represented by a character string "NG". The output value is allocated as the print content of the second arbitrary object.

By determining (setting) the print contents of the first and second arbitrary objects, respectively, in the above-described manner, the print contents of all the objects in the template are determined (set). In this state, the label printer 2 automatically generates print image data of the template as a whole; it is possible to prepare a print label by performing output and printing of the print image data on the tape 51 with the printing head 29. In the depicted example, a print string in which "Weight:", "100" and "g" which are arranged in series indicates that the weight value of the measurement object is 100 g. Further, in the depicted example, a print string in which "Result:", and "OK" are arranged in series indicates that the weight value of the measurement object is within the predetermined allowable range (Result of Determination: OK).

In such a manner, by utilizing the template including the arbitrary object of which print content is not determined (fixed), it is possible to print not only the weight value itself of the measurement object, but also together with an output value obtained by converting the weight value into an output value corresponding to the weight value (output value converted to another content different from the weight value). However, in the depicted comparative example, when performing the above-described printing processing, a user has to manually execute a converting processing ("manually performed converting processing" in the drawing) by referring to any conversion formula or conversion table so as to determine an output value, based on the weight value automatically obtained by the label printer 2. Further, the user also has to manually execute the processing of selecting any one of the arbitrary objects included in the template and allocating the selected object to the above-described weight value or the output value (corresponding to "manually performed (arbitrary object-)selecting and allocating processing" in the drawing). In view of such a situation, there is a demand for processing all the manually performed processings automatically by the label printer 2.

Furthermore, other than the depicted weight-result conversion outputting processing, there may be such a need to perform printing, together with the weight value itself of the measurement object as the result of the weight measurement, another content which corresponds to the weight value and which is different from the weight value. For example, the need may be exemplified by such a case of performing printing, for example, of a predetermined digit string made to correspond proportionally to the weight value (a delivery fee, etc., which is calculated to be more expensive as the weight becomes greater, etc.), and the like. Hover, any attempt to perform the above-described printing generally requires any additional software according to each need and an operational terminal to which the software is applied, etc. Also, a dedicated label printer having a specification corresponding to the need is required as well, resulting in decreasing the user-friendliness.

<Example of Performing Automatic Processing by Label Printer of Embodiment>
<Case of Weight-Result Conversion Output>

The label printer 2 of the present embodiment stores, in the memory 24, a large number of data bases each storing the corresponding relationship between the weight value and the predetermined output value in the memory 24. Further, as the arbitrary objects included in the template, an input object to which the weight value is to be allocated and an output object to which the output value is to be allocated are set in advance. Further, the input object and the output object are linked respectively to the input (namely, the weight value) and the output (namely, the output value) in the data base such that the input and the output in the data base are automatically allocated, respectively, to the input object and the output object, thereby solving the above-described task.

Figure 4:
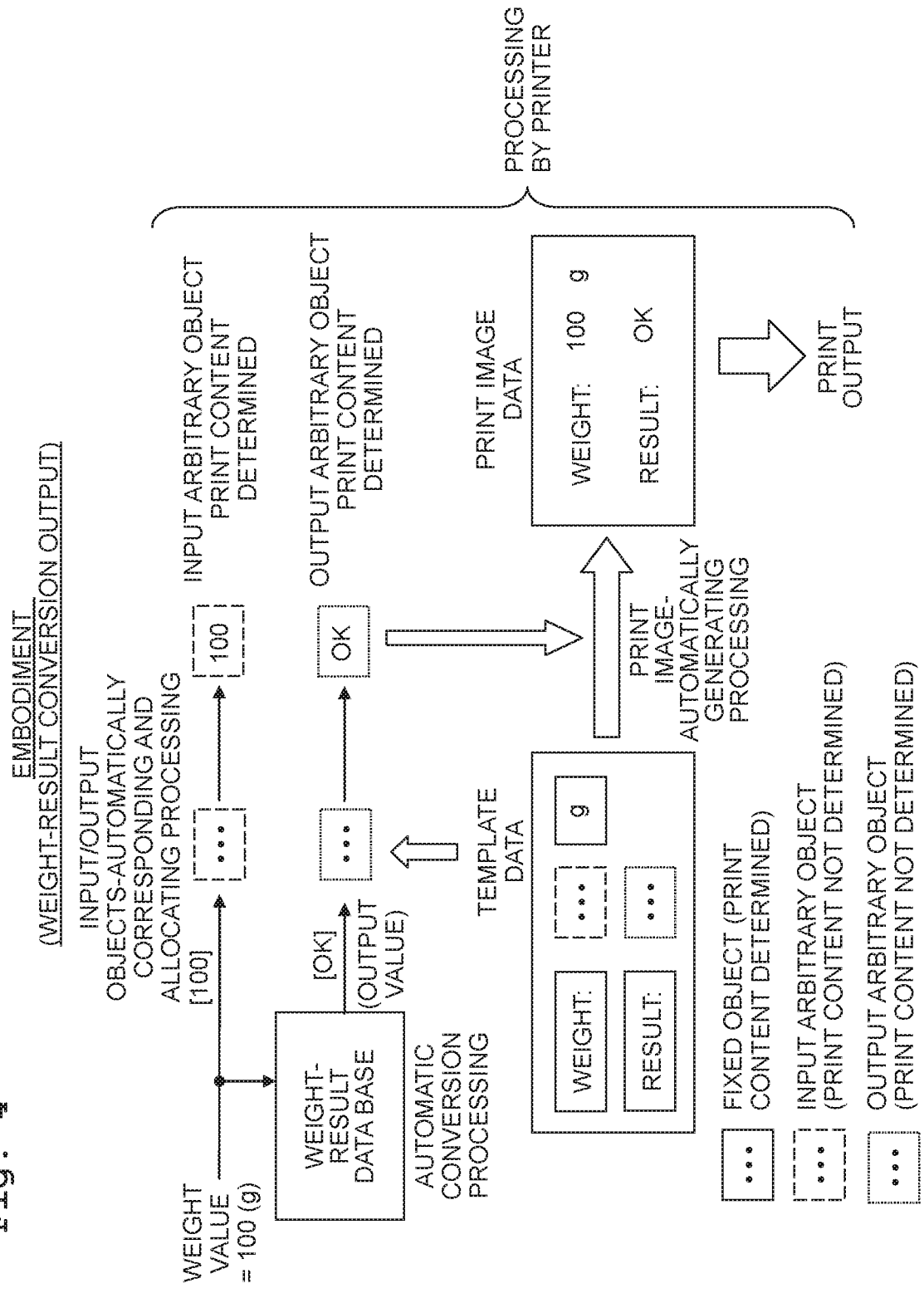
FIG. 4 is a view explaining the flow of processing a variety of kinds of data in an embodiment of the present disclosure wherein the weight-result conversion outputting processing is automatically processed.
Figure 6:
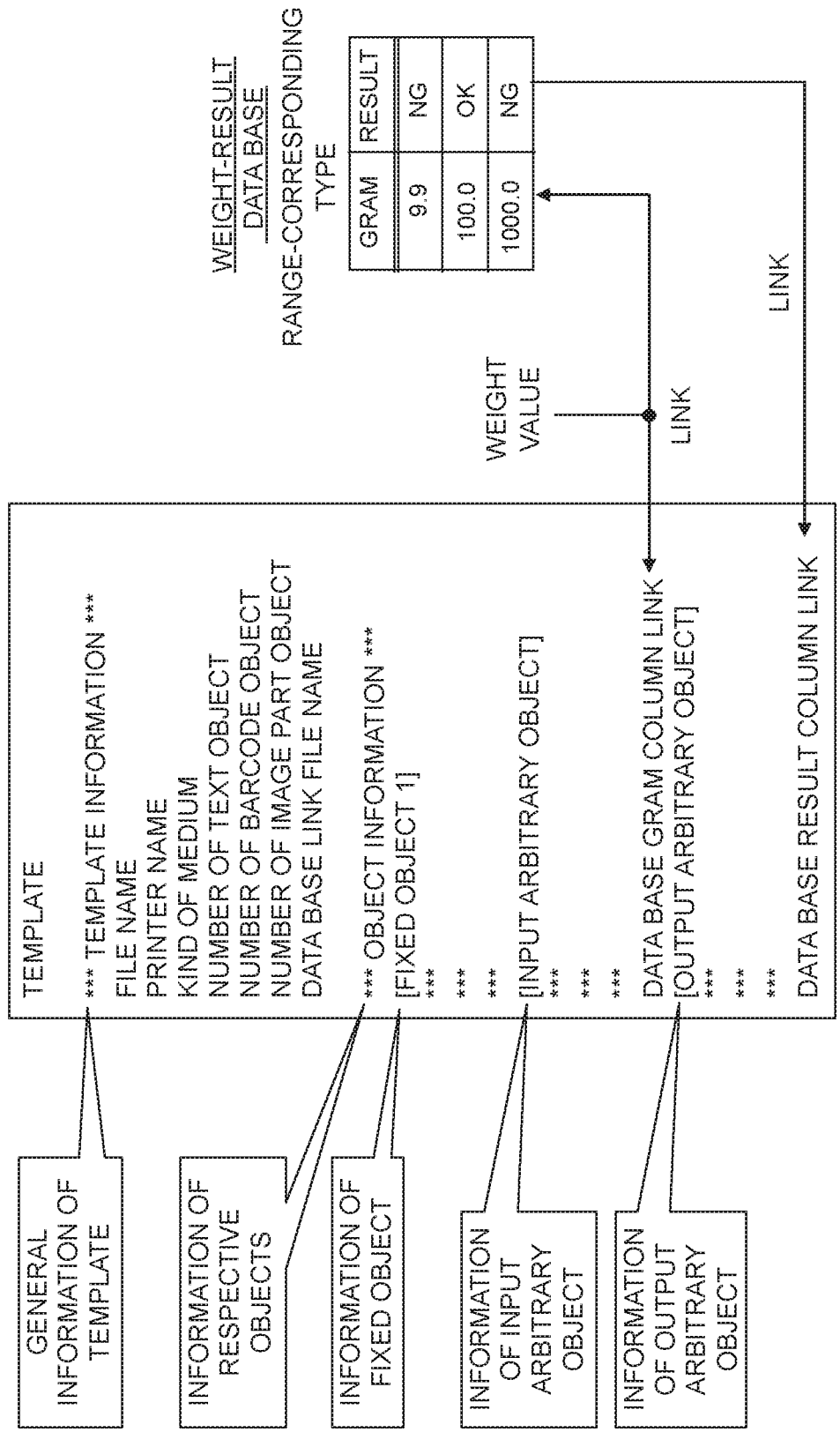
FIG. 6 is a view depicting an example of template data.

For example, regarding the case of the weight-result conversion output as depicted in FIG. 3, the label printer 2 of the present embodiment execute a processing as depicted in FIG. 4. Namely, the user selects, in advance, a template to be used and a data base suitable for the print content. In the template, an input arbitrary object (corresponding to an input object) which is to be linked with the weight value and an output arbitrary object (corresponding to an output object) which is to be linked with the output value of the data base are set in advance. In this example, a data base corresponding to the weight-result conversion output ("weight-result data base" in the drawing) is selected.

With this, in a case that the label printer 2 receives the weight measuring data from the weight measuring apparatus 3 and that the control circuit 23 obtains the weight value, the label printer 2 automatically allocates the weight value as the print content of the input arbitrary object. Further, the control circuit 23 refers to the weight-result data base and determines an output value corresponding to the weight value, and automatically allocates the output value as the print content of the output arbitrary object. In the above-described manner, all the weight-result conversion outputting processing as depicted in FIG. 3 can be automatically executed by the label printer 2. Note that a condition in this case whether or not the weight value is within a predetermined range corresponds to the predetermined condition of the present disclosure.

Two specific examples of such a weight-result data base usable in the weight-result conversion outputting processing are depicted in FIGS. 5A and 5B. FIG. 5A depicts an example of a resolution-corresponding type and FIG. 5B depicts an example of a range-corresponding type. In each of the two examples depicted in FIGS. 5A and 5B, the weight-result data base is constructed of two columns of fields which are a field corresponding to the weight value (corresponding to a first field: "Gram" in the depicted example) and a field corresponding to the output value (corresponding to a second field: "Result" in the depicted example).

The weight-result data base of the resolution-corresponding type in FIG. 5A is constructed such that regarding the measurement resolution of the weight measuring apparatus 3 of this example being "0.1 g", the rows of the record are set from a measurement lower limit value of 0.1 g up to a measurement upper limit value of 1000.0 g at an interval of 0.1 g (minimum unit recording item, namely, one frame in the drawing). In the depicted example, "OK" is outputted within a weight value range of 10.0 g to 100.0 g, and "NG" is outputted within a weight value range different from the weight value range of 10.0 g to 100.0 g.

The weight-result data base of the range corresponding type depicted in FIG. 5B is constructed such that a common range wherein a series of results of allowance which are consecutive in order of the weight value is coalesced so as to form one record. Note that in the depicted example, "NG" is outputted within a weight range of 0.0 g to 9.9 g, "OK" is outputted within a weight value range of 10.0 g to 100.0 g, and "NG" is outputted within a weight value range of 100.1 g to 1000.0 g, similarly to the data base depicted in FIG. 5A. In the weight value field (in the depicted example, "Gram"), the upper limit value (corresponding to a boundary value) of each of the weight value ranges is recorded.

In the data base of the resolution-corresponding type, it is possible to directly obtain an output value uniquely corresponding to an obtained weight value itself, whereas in the data base of the range-corresponding type, a processing of comparing the obtained weight value with each of the weight records in the weight value field to thereby search an output value corresponding to the obtained weight value. On the other hand, the data base of the range-corresponding type has a great advantage that the storage capacity thereof can be significantly reduced than that of the resolution-corresponding type.

Note that an example of the data content of a template which is linkable to the data base as described above is depicted in FIG. 6. The template data depicted in FIG. 6 includes template information and object information. The template information has a variety of kinds of information which are described therein and which are necessary when the template is used. The depicted example includes a file name, a printer name, kind of medium, number of text object, number of barcode object, number of image part object, name of data base link file, etc. Note that in this example, although a link file name of a data base as the object to which the template is linked (likable) is previously described in the template information, it is allowable, when preparing a print label, to newly designate a data base to which the template is to be linked (in the following, an explanation will be given regarding such a case wherein the linkable data base is newly designated).

In the object information, information regarding, for example, print position, style, print content, etc., of each of the objects included in the template are described. In the depicted example, object information regarding each of one fixed object, one input arbitrary object and one output arbitrary object is described. The input arbitrary object is linked with the weight value field (the gram column in the depicted example) of the designated data base (the weight-result data base in FIG. 5B in the depicted example). To the input arbitrary object, the weight value is allocated as the print content thereof. The output arbitrary object is linked with the output value field (the gram column in the depicted example). To the output arbitrary object, the value of the output value field (the "result" column in the depicted example) is allocated, as the print content thereof.

<Case of Weight-Fee Conversion Output>

Figure 7:
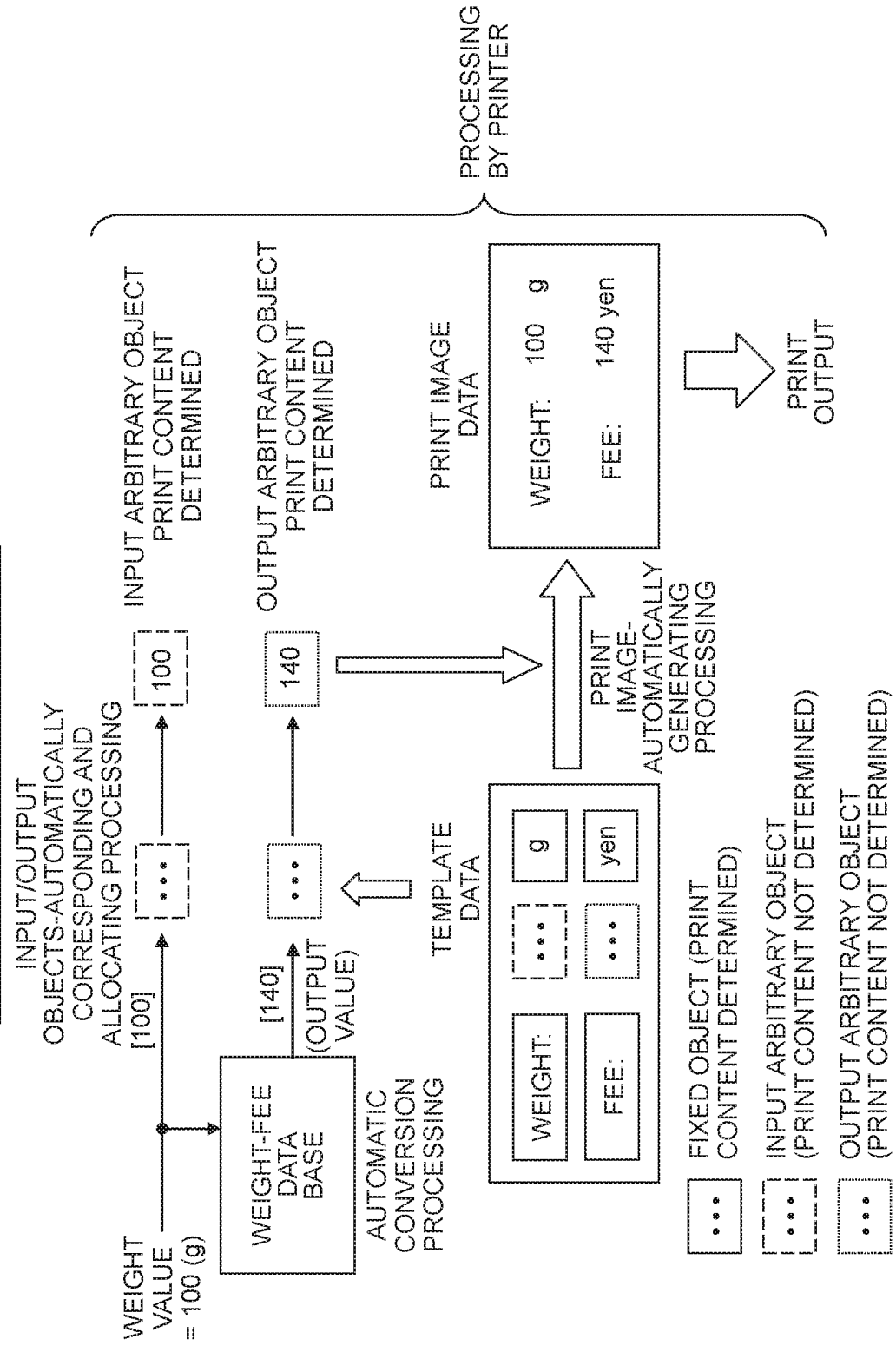
FIG. 7 is a view for explaining the flow of a variety of kinds of data processing in an embodiment wherein a weight-fee conversion outputting processing is automatically performed.

Further, the present embodiment has such a versatility that a variety of kinds of the processing for conversion output, which is different from the above-described weight-result conversion output, can be executed only by changing a template and a data base which are to be selected. For example, it is also possible to execute a processing of weight-fee conversion output as depicted in FIG. 7 which corresponds to FIG. 4. The example depicted in FIG. 7 indicates a case of printing a weight value of the measurement object and a delivery fee which is calculated such that as the weight value is increased (heavier), the delivery fee becomes higher.

In this case, the user (previously) selects a template and data base which are applicable to the weight-fee conversion output. The template of the depicted example has a print character string in which a fixed object "Weight:", an input arbitrary object and a fixed object "g" are arranged in series; and a print character string in which a fixed object "Fee:", an output arbitrary object and a fixed object "yen" are arranged in series. Further, a data base corresponding to the weight-fee conversion output ("weight-fee data base" in the drawing) is selected. With this, also in the processing of the weight-fee conversion output depicted in FIG. 7, it is possible to automatically execute all the processing until a print label is prepared, in a similar control procedure to that in the weight-result conversion output depicted in FIG. 4.

Two specific examples of such a weight-fee data base usable in the weight-fee conversion outputting processing are depicted in FIGS. 8A and 8B. The data base depicted in FIG. 8A is of the resolution-corresponding type and the data base depicted in FIG. 8B is of the range-corresponding type. Each of the weight-fee data bases depicted in FIGS. 8A and 8B is constructed of a field corresponding to the weight value ("Gram" in the depicted example) and a field corresponding to the output value ("Yen" in the depicted example). Note that in the data base of the range-corresponding type depicted in FIG. 8B, the upper limit value is indicated in the weight value field, similarly to that depicted in FIG. 5B.

The weight-result data bases in FIGS. 5A and 5B are each constructed such that the output value is set to be any one of the two kinds of character string which are "OK" and "NG" (so-called binary classification). It is allowable, however, that the output value of the data base is set to be a variety of kinds of digit strings having a variety of kinds of values (so-called logistic regression), as in the weight-fee data base depicted in FIGS. 8A and 8B. In such a case, the data base of the resolution-corresponding type is capable of, for example, easily performing a nonlinear and complex conversion of the output value, even without preparing a program for arithmetic processing with a complex arithmetic expression (not specifically depicted in the drawings).

<Control Procedure of Label Preparing Processing>

With reference to FIG. 9, an explanation will be given about a label preparing processing executed by the control circuit 23 of the label printer 2, in order to realize a method for preparing print label in the above-described print label preparing system 1. The processing in FIG. 9 is started, for example, in a case that an operation to instruct production of print label is inputted from the user to the label printer 2 in a state that the measurement object has been already placed (loaded) on the loading plate 32 of the weight measuring apparatus 3.

In FIG. 9, at first in step S105, the control circuit 23 receives selection and input of a template to be used, from the user via the operation part 22.

Next, the procedure proceeds to step S110 wherein the control circuit 23 obtains the template selected in step S105 from the memory 24. Note that step S110 corresponds to a template obtaining processing of the present disclosure.

Next, the procedure proceeds to step S115 wherein the control circuit 23 receives selection and input of a data base to be used, from the user via the operation part 22.

Next, the procedure proceeds to step S120 wherein the control circuit 23 obtains the data base selected in step S115 from the memory 24. Note that step S120 corresponds to a data base obtaining processing of the present disclosure.

Next, the procedure proceeds to step S125 wherein the control circuit 23 obtains the input arbitrary object among the objects included in the template obtained in step S110.

Next, the procedure proceeds to step S130 wherein the control circuit 23 obtains the output arbitrary object among the objects included in the template obtained in step S110.

Next, the procedure proceeds to step S135 wherein the control circuit 23 receives the weight measurement data from the weight measuring apparatus 3, and obtains the weight value from the weight measurement data.

Next, the procedure proceeds to step S140 wherein the control circuit 23 allocates the weight value obtained in step S135 to the input arbitrary object. Note that step S140 corresponds to a weight data allocating processing of the present disclosure.

Next, the procedure proceeds to step S200 wherein the control circuit 23 executes an output value determining processing in which the control circuit 23 refers to the data base obtained in step S120 and determines an output value corresponding to the weight value obtained in step S135.

Next, the procedure proceeds to step S145 wherein the control circuit 23 allocates the output value determined in step S200 to the output arbitrary object. Note that step S200 and step S145 correspond to an output value allocating processing of the present disclosure.

Next, the procedure proceeds to step S150 wherein the control circuit 23 reflects the input arbitrary object allocated in step S140 and the output arbitrary object allocated in step S145 in the template obtained in step S110, thereby generating print image data.

Next, the procedure proceeds to step S155 wherein the control circuit 23 performs printing on the tape 51 based on the print image data generated in step S150, thereby preparing a print label. Note that step S150 as described above and this step S155 correspond to a printing processing of the present disclosure.

Next, the procedure proceeds to step S160 wherein the control circuit 23 determines whether or not an ending instruction for ending the preparation of the print label is inputted from the user via the operation part 22. In a case that the ending instruction is not inputted from the user (S160: NO), the control circuit 23 returns the procedure to step S135 and repeats the procedure similar to that described above.

On the other hand, in a case that the ending instruction is inputted from the user (S160: YES), the control circuit 23 ends this flow.

Next, an explanation will be given about the output value determining processing of step S200, with reference to FIG. 10. Although the processing in FIG. 10 basically corresponds to a data base of the range-corresponding type, this processing is also executable similarly also to a data base of the resolution-type.

Figure 10:
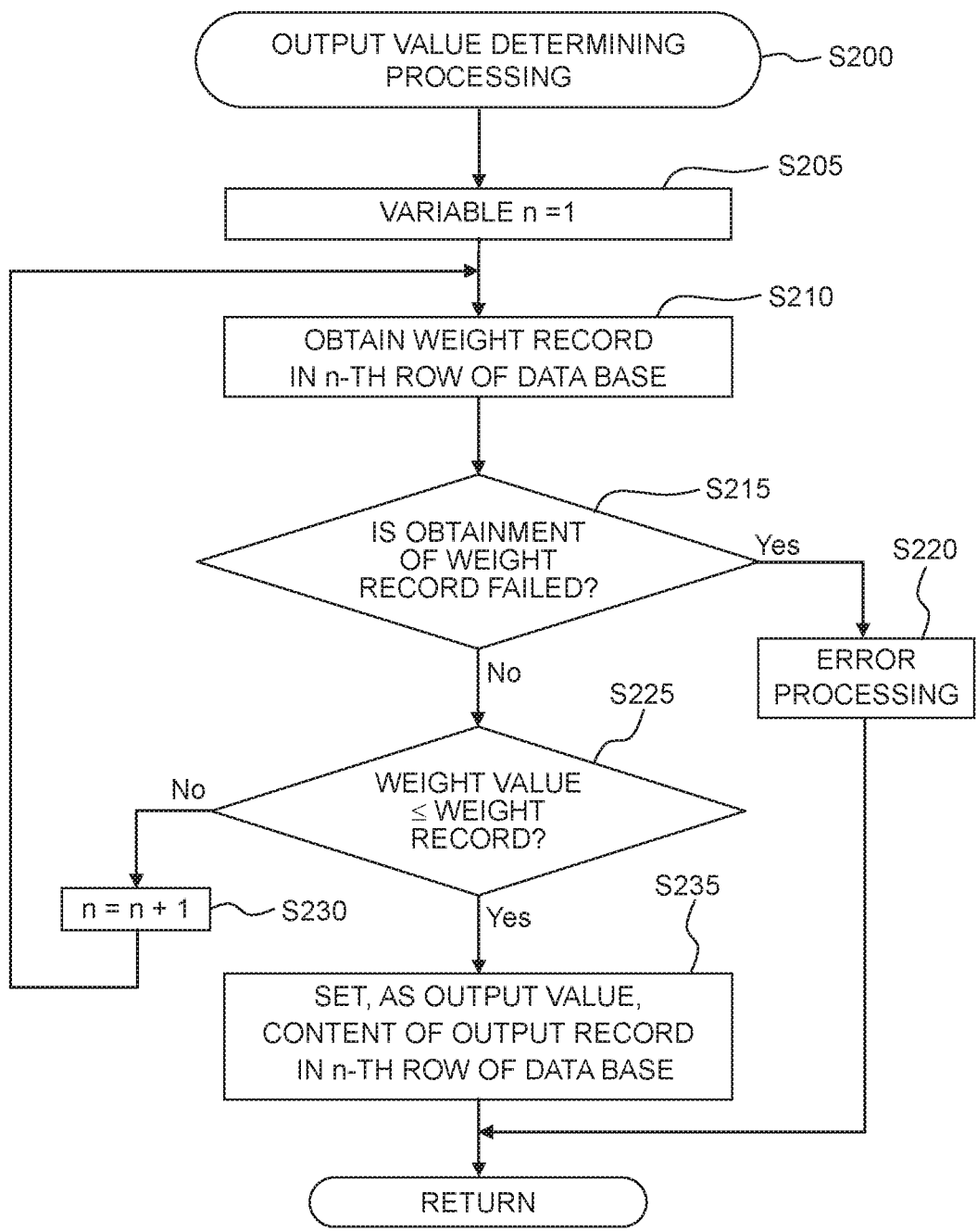
FIG. 10 is a flow chart depicting the procedure in an output value determining processing executed by the control circuit of the label printer.

In step S205 of FIG. 10, the control circuit 23 sets a value of a variable n to "1", as the default setting.

Next, the procedure proceeds to step S210 wherein the control circuit 23 obtains a weight record of a n-th row in the weight value field of the data base.

Next, the procedure proceeds to step S215 wherein the control circuit 23 determines as to whether or not the obtainment of the corresponding weight record in step S210 has been failed. In other words, the control circuit 23 determines as to whether or not the obtained weight value was too great and exceeded the weight range to which the data base corresponds. In a case that the obtainment of the weight record has been failed (S215: YES), the control circuit 23 proceeds the procedure to step S220.

In step S220, the control circuit 23 performs an error processing of, for example, causing the display 21 to display a content that the obtained weight value was so big that the obtained data exceeds the corresponding weight range of the data base, etc., and ends this flow.

On the other hand, in a case that the obtainment of the weight record has been succeeded in step S215 (S215: NO), the control circuit 23 proceeds the procedure to step S225.

In step S225, the control circuit 23 determines as to whether or not the weight value is not more than the weight record obtained in step S210. In a case that the weight value is greater than the weight record (S225: NO), the control circuit 23 proceeds the procedure to step S230.

In step S230, the control circuit 23 adds "1" to the value of the variable n, then returns the procedure to step S210 and repeats the procedure similar to that described above.

On the other hand, in a case that the weight value is not more than the weight record (S225: YES) in the determination of step S225, the control circuit 23 proceeds the procedure to step S235.

In step S235, the control circuit 23 sets, as the output value, the content of the n-th row in the output value field of the data base. Then, the control circuit 23 ends this flow.

Effect of Embodiment

As explained above, according to the label printer 2 of the present embodiment, the expanded function of the template in which each of the two arbitrary objects is associated with the data base is used to thereby make it possible to perform printing in such an aspect wherein the weight value of the measurement object is converted into a content different from the weight value. As a result, since this eliminates any needs to additionally prepare the software and/or the operation terminal as described above, the user-friendliness can be improved.

Further, in the present embodiment, the digit string of the weight value is allocated to the weight value field and the character string or the digit string is allocated to the output value field of each of the records in the data base of the resolution-corresponding type. Further, in a case that the weight measurement data from the weight measuring apparatus 3 is obtained, then in step S145 and in step S200 as described above, the record to which the weight value corresponding to the obtained weight data belongs is specified. The character string or the digit string allocated to the output value field in the specified record is determined as the output value, and is allocated to the output arbitrary object. With this, it is possible to perform printing in an aspect in which the weight value of the measurement object is converted into a content different from the weight value, with a relatively simple method.

Furthermore, in the data base of the range-corresponding type in the present embodiment, the digit string of the weight value is allocated to the weight value field and the character string or the digit string is allocated to the output value field of each of the records. Then, the user selects consecutive records which are included in the records, by performing an appropriate operation with respect to the label printer 2, thereby making it possible to set a plurality of numerical ranges having values of the weight value field (weight value) of the selected consecutive records, as boundary values thereof (the upper values in FIGS. 5A, 5B, 8A and 8B), respectively.

Moreover, in a case that the weight data is obtained from the weight measuring apparatus 3, then in steps S200 and S145, a numerical range which is included in the plurality of numerical ranges and which includes a weight value corresponding to the obtained weight data is specified. Further, the character string or the digit string allocated to the output value field of a record, included in the records, to which the specified numerical range belongs, is determined as the output value, and the determined output value is allocated to the output arbitrary object.

This makes it possible to perform the printing in an aspect wherein the weight value of the measurement object is converted into a content different from the weight value. In particular, it is possible to set a plurality of numerical ranges in a data base of the resolution-corresponding type, and to make the weight value of the measurement object to correspond to the numerical ranges. Accordingly, it is possible to reduce the data capacity in the data base of the range-corresponding type, as compared with the data base of the resolution-corresponding type wherein the weight value of the measurement object is made to correspond to the value of the weight value field of each of the records in a one-to-one manner.

Further, in the present embodiment, in a case of using the weight-fee data base, a predetermined digit string made to correspond proportionally to the weight value is determined as the output value in steps S200 and S145, and is allocated to the output arbitrary object. Since it is possible to perform printing of a digit string made to correspond proportionally to the weight value of the measurement object (for example, a delivery fee or charge, etc., which is calculated to be more expensive as the weight becomes greater, etc.), it is possible to enhance the user-friendliness.

Further, in the present embodiment, in a case of using the weight-result data base, a predetermined character string representing whether or not the weight value satisfies a predetermined condition is determined as the output value, and is allocated to the output arbitrary object, in steps of S200 and S145. Since it is possible to perform printing of the character string representing whether or not the weight value of the measurement object satisfies the predetermined condition (for example, "OK", "NG", etc., corresponding as to whether or not the weight value is within a previously presumed weight range), it is possible to enhance the user-friendliness.

Note that the present disclosure is not limited to or restricted by the above-described embodiment; a variety of kinds of modification is possible in a range not departing from the gist and/or sprit and the technical idea of the present disclosure. Such modifications will be explained as follows. Note that in each of the modifications, a part or portion similar to that in the embodiment is assigned with same reference numeral and any explanation therefor or illustration thereof in the drawings will be simplified or omitted, as appropriate.

(1) Case of Using a Plurality of Kinds of Input Parameters

In the above-described embodiment, only the weight value measured by the weight measuring apparatus 3 is used as the parameter which is (to be) inputted to the data base (namely, the parameter (to be) allocated to the input arbitrary object). The present disclosure, however, is not limited to this. For example, it is allowable to input another kind of parameter such as the dimension (size) of the measurement object, together with the weight value, to the data base, and to determine a predetermined output value. FIGS. 11A and 11B each depict an example of a weight-size-fee data base usable in such a case.

The data base depicted in FIG. 11A is an example of a weight-size-fee data base of the range-corresponding type in which field columns which correspond to the size and the weight value as input parameters, respectively, and a field column of the fee as an output parameter are arranged in series in a side-by-side manner. This data base indicates, in a case that the size which is within a range of 0 to 60 and that the weight which is within a range of 0 to 2.0 are inputted, that the output value (fee) corresponding to the inputted size and weight is 740 yen. Further, this data base indicates, in a case that the size which is within a range of 61 to 80 and that the weight which is within a range of 2.1 to 5.0 are inputted, that the output value (fee) corresponding to the inputted size and weight is 1000 yen. Furthermore, this data base indicates, in a case that the size which is within a range of 81 to 100 and that the weight which is within a range of 5.1 to 10.0 are inputted, that the output value (fee) corresponding to the inputted size and weight is 1260 yen.

The data base depicted in FIG. 11B is an example of a weight-size-fee data base of the two-dimensional range-corresponding type in which field columns which correspond to the size and the weight value as input parameters are made to be orthogonal to each other, and the fee as an output parameter is arranged in the two-dimensional field matrix. In this data base, any one of fees which are 740 yen, 1000 yen and 1260 yen is allocated while the fees are made to correspond, respectively, to the combinations of three size ranges which are sizes of 0 to 60, 61 to 80 and 81 to 100 and to three weight ranges which are weight of 0 to 2.0, 2.1 to 5.0, and 5.1 to 10.0. Note that all the ranges in FIGS. 11A and 11B are represented by the upper limit values thereof, respectively.

An input parameter which is different from the weight value (the size in this case) is obtained from another data received from the measuring apparatus 3 or from data inputted from the user via the operation part 22. The plurality of parameters and the weight value are inputted to the corresponding data base so as to determine one output value (the fee in this case). Then, by allocating the input parameter(s) to the input arbitrary object (one or two pieces of the input arbitrary object in this case) and by allocating the output value to the output arbitrary object so as to generate the print image data, thereby making it possible to prepare a print label, similarly to the above-described embodiment.

As described above, in the present modification, the digit strings each representing the predetermined condition regarding the measurement object ("60", "80", "100" in this case) are allocated to the size field of each of the records. The weight-size-fee data base is constructed such that a plurality of numerical ranges are settable by selecting a plurality of sets of consecutive records which is included in the plurality of records. Further, the digit string in the fee field which corresponds to a numerical range including the weight value of the measurement object and a numerical range including the size of the measurement object, among the plurality of numerical ranges, is determined as the output value and is allocated to the output arbitrary object.

In the present modification, the selection of the plurality of sets of consecutive records in the weight-size-fee data base makes it possible to set a plurality of numerical ranges regarding the plurality of contents which are the weight value and the predetermined condition of the measurement object. By causing the weight value and the predetermined condition of the measurement object to associate (correspond), respectively, to the plurality of numerical ranges, it is possible to perform printing in an aspect in which the weight value and the predetermined condition are converted into another content different therefrom.

(2) Case of Selecting Output Values Determined in a Plurality of Data Bases, Respectively In the above-described embodiment, an output value determined in one data base is allocated as it is to the output arbitrary object in the template. The present disclosure, however, is not limited to this. For example, it is allowable to cause one template to correspond to a plurality of data bases, and to allocate only one output value, which is included in a plurality of output values determined in the plurality of data bases, respectively, and which satisfies a predetermined condition, to the output arbitrary object.

For example, FIGS. 12A to 12C correspond respectively to tables of delivery fees, regarding weight, of three delivery companies A to C having mutually different fee systems. Namely, in the tables of delivery fees of the three companies A to C, the range width of weight and fees corresponding thereto are mutually different. There is such a case that a user, etc., wishes to automatically know, regarding a measurement object of a certain weight, as to which case of consigning the delivery of the measurement object to which one of the three delivery companies results in the cheapest fee.

Figure 13:
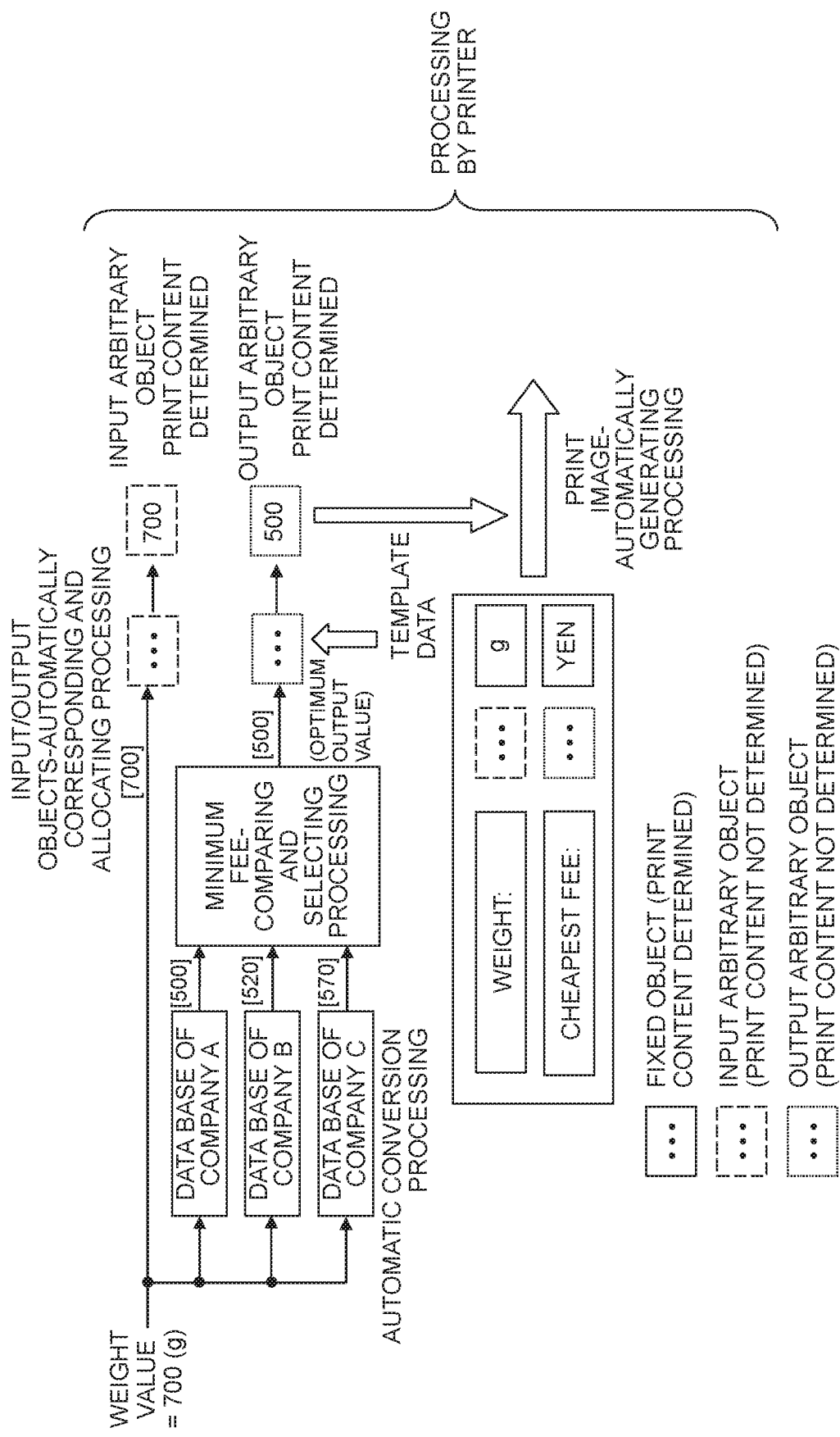
FIG. 13 is a view explaining the flow of a variety of kinds of data processing in a case of automatically processing a weight-minimum fee conversion outputting processing.

In view of the above-described situation, the present modification executes a weight-fee conversion outputting processing as depicted in FIG. 13 which corresponds to FIG. 7. The depicted example indicates a case of printing the weight value of a measurement object and an optimal output value which is the cheapest delivery fee corresponding to the weight value.

In this case, the user selects a template which is applicable to the weight-fee conversion output and a plurality of data bases which serve as candidates. Then, the control circuit 23 refers to the selected plurality of data bases, and outputs delivery fees respectively from the selected data bases (Company A: 500 yen, Company B: 520 yen, and Company C: 570 yen in the depicted example), each of the delivery fees corresponding to a common weight value (700 g in the depicted example). Then, the control circuit 23 performs a minimum fee comparing and selecting processing of comparing the outputted delivery fees to one another and of selecting one minimum (cheapest) delivery fee. The control circuit 23 allocates the selected delivery fee to the output arbitrary object, as the final optimal output value. By doing so, it is possible to automatically print the cheapest delivery fee.

In the present modification, a plurality of data bases of which contents are mutually different are referred, and a plurality of output values each corresponding to the weight value of the weight data are outputted. One optimum output value, which is included in the plurality of output values and which optimally satisfies a predetermined selective condition (in this case, the cheapest fee) among the plurality of output values, is determined and is allocated to the output arbitrary object of the template. Then, the print is formed on the tape 51 by the template which is in a state that the weight data is allocated to the input arbitrary object and the optimal output value is allocated to the output arbitrary object.

In the present modification, even in a case that digit strings which are made to correspond, as the output values, to the weight value of a same measurement object are mutually different, it is possible to perform the printing by using a template with which a digit string, among the digit strings, which has the minimum value as the optimal condition can be automatically obtained. As a result, it is possible to eliminate any labor which would be otherwise required for the user himself or herself to perform comparison and consideration regarding the plurality of output values and to thereby select the (optimal) output value. Note that the optimal condition is not limited to or restricted by the minimum value, and may be the maximum value, another condition, etc.

(3) Case of Performing the Processing by a General Purpose PC

Figure 14:
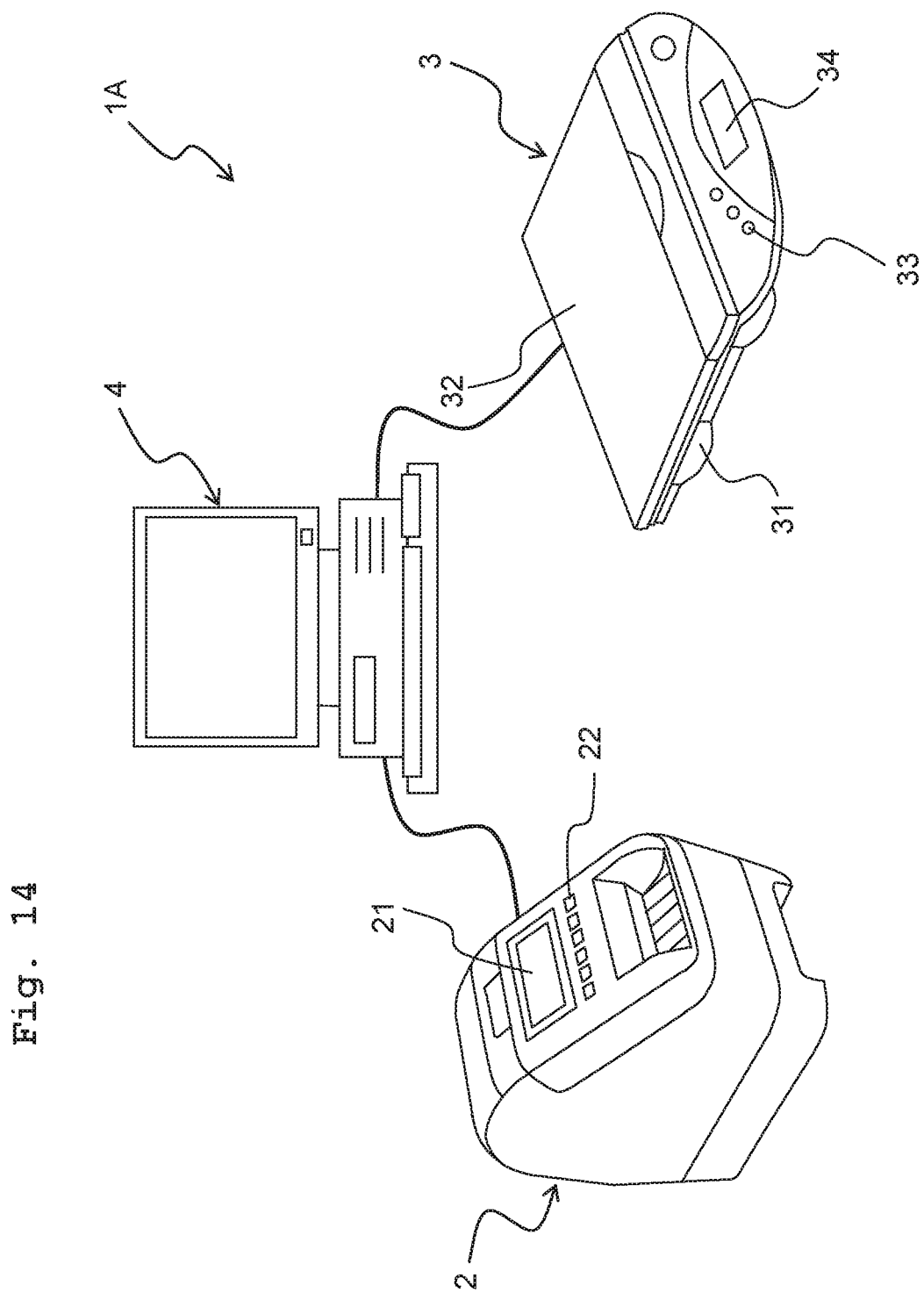
FIG. 14 is a schematic view of a print label preparing system in a case of using a general purpose PC (Personal Computer).

Although the present embodiment causes the label printer 2 directly connected with respect to the weight measuring apparatus 3 to execute all the processings including the weight conversion outputting processing, the present disclosure is not limited to or restricted by this. For example, as depicted by FIG. 14 corresponding to FIG. 1, it is allowable that each of the weight measuring apparatus 3 and the label printer 2 is connected with respect to a general purpose PC (personal computer) 4 as the host such that information can be transmitted and received therebetween, and that the processing such as the weight conversion outputting processing is assigned to the general purpose PC 4 in a sharing manner.

In this case, it is allowable to cause the general purpose PC 4 to execute any one or all of the processing of obtaining the weight value, the processing of obtaining the template, the processing of obtaining the data base, the processing of determining the output value by utilizing the data base, the processing of performing allocation with respect to the input and output arbitrary objects, the processing of generating the print image data, etc., in the above-described embodiment and each of the above-described modifications. In such a situation, it is allowable that a program such as an editor executed by the CPU (corresponding to a processor) of the general purpose PC 4 (corresponding to a terminal) generates the print image data and transmits the print image data to the label printer 2 (corresponding to a second transmitting processing). It is allowable that the label printer 2 executes, at least, the processing of printing the print image data on the tape 51 and of preparing a print label.

Figure 15:
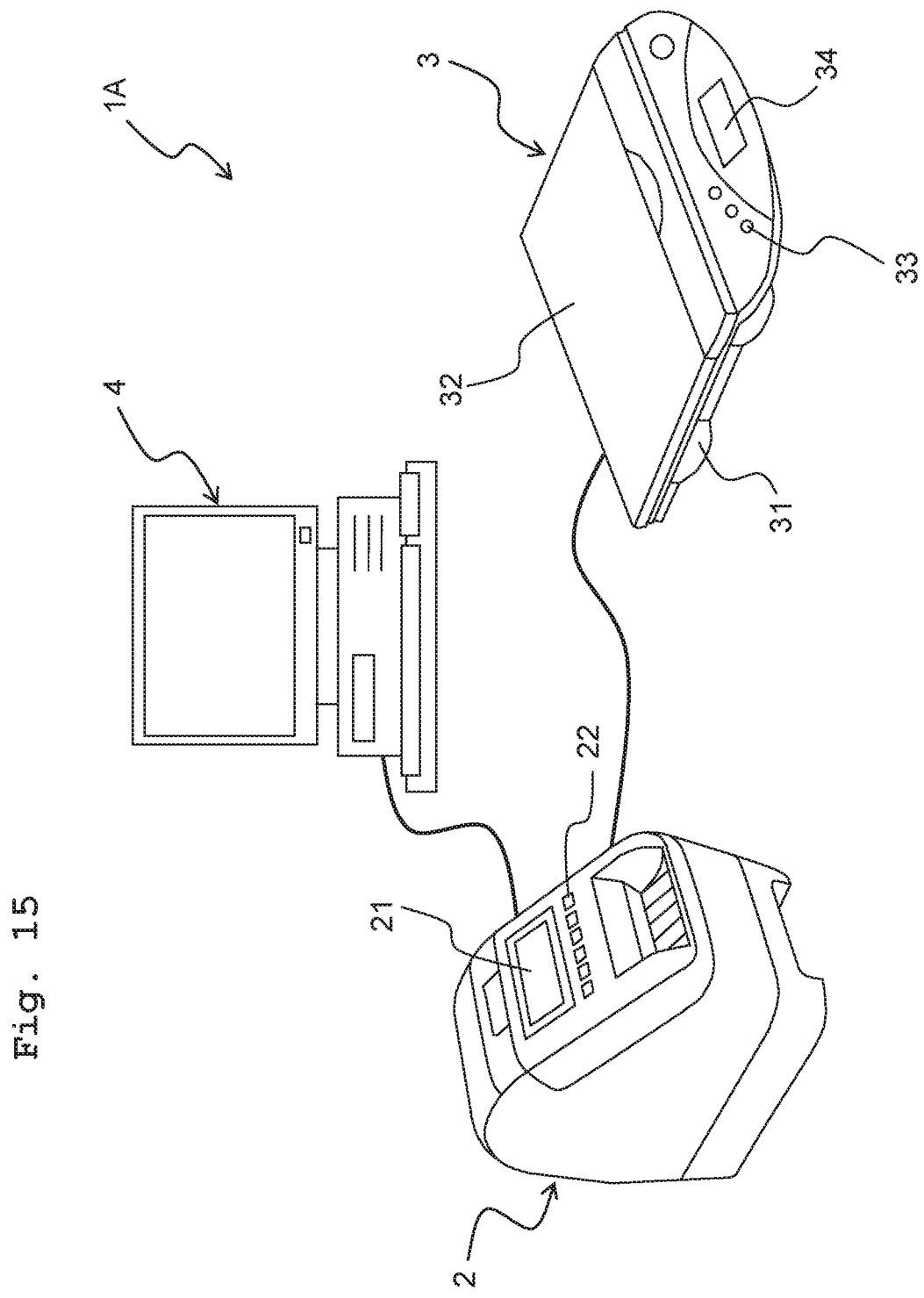
FIG. 15 is a schematic view of another print label preparing system in a case of using a general purpose PC.

Further, it is allowable that the general purpose PC 4 uses a variety of kinds of applications in combination so as to newly generate data of the template and/or a data base itself (corresponding to a data base generating processing and a first template generating processing). In this case, the general purpose PC 4 may transmit the generated template and/or data base to the label printer 2 (corresponding to a first transmitting processing), and the label printer 2 may store the template and/or data base received from the general purpose PC 4 to the memory 24 and may execute the weight conversion outputting processing as in the above-described embodiment (the weight value is received via the general purpose PC 4). Alternatively, as depicted in FIG. 15, it is also allowable to connect the label printer 2, as the host, with respect to both of the weight measuring apparatus 3 and the general purpose PC 4. In such a case, the general purpose PC 4 may obtain the weight value via the label printer 2, and may execute any processing which is different from the printing processing.

Note that in the foregoing description, the arrows indicated in FIG. 2, etc., indicate an example of a flow of a signal, and not are intended to restrict or limit the direction of flow of the signal.

Furthermore, the flowcharts indicated in FIGS. 9 and 10 are not intended to limit or restrict the present disclosure to the procedures of the flows indicated in these figures. It is allowable to make any addition and/or deletion in the procedure or to change the order in the procedure, within a range not departing from the gist and/or sprit and the technical idea of the present disclosure.

Moreover, it is allowable to use the method of the embodiment and the methods in the respective modifications in a combined manner, in addition to those already described above.

Other than those described above, though not exemplified, the present disclosure may be realized by adding a variety of kinds of changes thereto, within a range not departing from the gist and/or sprit of the present disclosure.

What is claimed is:

1. A printer connectable to a weight measuring apparatus which is configured to measure weight of a measurement object and to output weight data corresponding to the measured weight, the printer comprising:
    a printing head configured to perform printing on a print medium; and
    a controller,
    wherein the controller is configured to execute:
    a data base obtaining processing of obtaining a data base having a first field and a second field, weight values being stored in the first field, output values corresponding respectively to the weight values being stored in the second field;
    a template obtaining processing of obtaining a template in which an input object and an output object are arranged in a predetermined manner, the input object being linked with the first field of the data base, the output object being linked with the second field of the data base;
    a weight data allocating processing of allocating the weight data received from the weight measuring apparatus to the input object of the template;
    an output value allocating processing of determining, based on the data base, an output value which corresponds to the weight data received from the weight measuring apparatus, and of allocating the determined output value to the output object of the template; and
    a printing processing of performing the printing on the print medium based on the template in which the weight data is allocated to the input object and the determined output value is allocated to the output object, wherein in the data base obtaining processing, the controller is configured to further obtain another data base of which content is different from that of the data base,
    in the output value allocating processing, the controller is configured to:
        further determine another output value which corresponds to the weight data received from the weight measuring apparatus, based on the another data base; and
        allocate one optimum output value, which is one of the determined output value and the determined another output value and which optimally satisfies a predetermined selective condition, to the output object of the template, and
    in the printing processing, the controller is configured to perform the printing on the print medium based on the template in which the weight data is allocated to the input object and the optimum output value is allocated to the output object.

2. The printer according to claim 1,
    wherein each of the weight values is a digit string,
    each of the output values is a character string or a digit string, and
    in the output value allocating processing, the controller is configured to determine a weight value which is included in the weight values stored in the first field and which corresponds to the weight data, and to determine, as the output value, an output value which is included in the output values stored in the second field and which corresponds to the determined weight value.

3. The printer according to claim 2,
    wherein each of the output values is the digit string, and the output values are made to correspond proportionally to the weight values, respectively.

4. The printer according to claim 2, wherein each of the output values is the character string indicating whether the weight data satisfies a predetermined condition.

5. The printer according to claim 1,
    wherein each of the weight values is a digit string,
    each of the output values is a character string or a digit string,
    the weight values correspond respectively to numerical ranges, the weight values representing, respectively, boundary values of the numerical ranges, and
    in the output value allocating processing, the controller is configured to determine a weight value which is included in the weight values stored in the first field and which corresponds to a numerical range including the weight data therein, and to determine, as the output value, an output value which is included in the output values stored in the second field and which corresponds to the determined weight value.

6. The printer according to claim 5,
    wherein the data base further has a third field,
    conditions regarding the measurement object are stored in the third field,
    each of the conditions is a character string or a digit string, and
    in the output value allocating processing, the controller is configured to further determine a condition which is included in the conditions stored in the third field and which is satisfied by the measurement object, and to determine, as the output value, an output value which is included in the output values stored in the second field and which corresponds to the determined weight value and the determined condition.

7. A non-transitory computer-readable medium storing programs executable by a processor of a terminal which is connectable to a printer and a weight measuring apparatus, the weight measuring apparatus being configured to weigh a target and output weight data of the target, the programs, when executed by the processor, causing the terminal to execute:
- a data base generating processing of generating a data base having a first field and a second field, weight values being stored in the first field, output values corresponding respectively to the weight values being stored in the second field;
- a first template generating processing of generating a template in which an input object and an output object are arranged in a predetermined manner, the weight data received from the weight measuring apparatus being allocated to the input object, an output value which corresponds to the weight data received from the weight measuring apparatus and which is determined based on the data base being allocated to the output object;
- a first transmitting processing of transmitting the data base and the template to the printer, wherein in the data base generating processing, obtaining another data base of which content is different from that of the data base, in the first template generating processing:
- further determining another output value which corresponds to the weight data received from the weight measuring apparatus, based on the another data base; and
- allocating one optimum output value, which is one of the output value and the another output value and which optimally satisfies a predetermined selective condition, to the output object of the template; and
- a printing processing, including printing on a print medium based on the template in which the weight data is allocated to the input object and the optimum output value is allocated to the output object.

8. A non-transitory computer-readable medium storing programs executable by a processor of a terminal which is connectable to a printer, the printer being connectable to a weight measuring apparatus which is configured to weigh a target and output weight data of the target, the programs, when executed by the processor, causing the terminal to execute:
- a data base generating processing of generating a data base having a first field and a second field, weight values being stored in the first field, output values corresponding respectively to the weight values being stored in the second field;
- a template generating processing of generating a template in which an input object linked with the first field and an output object linked with the second field are arranged in a predetermined manner;
- a weight data allocating processing of obtaining the weight data from the weight measuring apparatus via the printer and of allocating the weight data to the input object of the template;
- an output value allocating processing of allocating an output value, which corresponds to the weight data received from the weight measuring apparatus and which is determined based on the data base, to the output object of the template;
- a print data generating processing of generating print data usable for performing printing on a print medium, by using the template in which the weight data is allocated to the input object and the output value corresponding to the weight value is allocated to the output object;
- a transmitting processing of transmitting the print data to the printer, wherein in the data base generating processing, further obtaining another data base of which content is different from that of the data base, in the template generating processing:
- further determining another output value which corresponds to the weight data received from the weight measuring apparatus, based on the another data base; and
- allocating one optimum output value, which is one of the output value and the another output value and which optimally satisfies a predetermined selective condition, to the output object of the template; and
- a printing processing, including printing on a print medium based on the template in which the weight data is allocated to the input object and the optimum output value is allocated to the output object.

* * * * *